United States Patent [19]

Aignesberger et al.

[11] 3,941,734

[45] Mar. 2, 1976

[54] PROCESS FOR PREPARING A SULFITE MODIFIED MELAMINE RESIN SOLUTION

[75] Inventors: Alois Aignesberger, Trostberg, Upper Bavaria; Paul Bornmann, Stein an der Traun, both of Germany

[73] Assignee: Suddeutsche Kalkstickstoff-Werke Aktiengesellschaft, Trostberg, Germany

[22] Filed: Apr. 17, 1974

[21] Appl. No.: 461,614

[52] U.S. Cl. .................... 260/29.4 R; 260/67.6 R
[51] Int. Cl.² ......................................... C08L 61/20
[58] Field of Search ................... 260/67.6 R, 29.4 R

[56] References Cited
UNITED STATES PATENTS

| | | | |
|---|---|---|---|
| 2,407,599 | 9/1946 | Auten et al. | 260/69 N |
| 2,730,516 | 1/1956 | Suen et al. | 260/29.4 R |
| 2,863,842 | 12/1958 | Bonzagni | 260/67.6 R |
| 3,661,829 | 5/1972 | Aignesberger et al. | 260/29.4 R |

Primary Examiner—Lorenzo B. Hayes
Attorney, Agent, or Firm—Hans Berman; Kurt Kelman

[57] ABSTRACT

The aqueous melamine resin solutions prepared according to the process of U.S. Pat. No. 2,730,516 by sequential condensation of a sulfite bearing, aqueous solution of melamine and formaldehyde at alkaline and acid pH and subsequent neutralization is stabilized by preliminary condensation of the melamine and formaldehyde prior to addition of the sulfite and by refluxing the ultimate condensation mixture at pH 8.5 for 1 hour or more. Concrete mixtures prepared with the stabilized resin solutions cure more rapidly.

4 Claims, No Drawings

PROCESS FOR PREPARING A SULFITE MODIFIED MELAMINE RESIN SOLUTION

This invention relates to sulfite-modified melamine-formaldehyde resins, and particularly to a process for preparing an aqueous, sulfite-modified melamine resin solution.

In its more specific aspects, the invention relates to an improvement in the process of U.S. Pat. No. 2,730,516. The known process reacts melamine with formaldehyde and an alkali metal sulfite in an aqueous medium to produce water soluble resins which are not thermosetting. The aqueous solutions of the known resins, however, have a limited shelf life. Both the pH value and the viscosity of the solution drop relatively fast. Since the resins have found an important field of application in the construction industry as additives to concrete mixtures, an extended storage life of the aqueous resin solutions would be desirable.

It has now been found that the pH and viscosity of such resins can be kept virtually unchanged for several months if the resin solutions prepared in the known manner are refluxed, or kept at a temperature at which they would reflux at ordinary atmospheric pressure, for 1 to 3 hours at a pH value of 8 to 11, preferably approximately pH 8.5. It has further been found that the curing time of concrete mixtures and like cementitious compositions containing the resins is reduced if the melamine and formaldehyde are held under mild condensing conditions before being further reacted with sulfite. Best resins are obtained by combining both measures.

According to the known process, a resin solution is prepared by first dissolving melamine in aqueous formaldehyde solution at elevated temperature until a clear solution is formed, promptly cooling the solution, dissolving an alkali metal sulfite in the cooled solution, adjusting the resulting, sulfite-bearing solution to a pH above 7, heating the alkaline solution for a first, alkaline condensation, cooling and acidifying the mixture, again heating it to cause condensation, and adjusting the acid condensation mixture to a pH above 7.

According to a primary feature of this invention, the ultimate condensation mixture is adjusted to a pH of 8 to 11, and heated for 1 to 3 hours to the temperature at which it refluxes when at ordinary, atmospheric pressure. It is further preferred to hold the clear solution of melamine in formaldehyde solution at pH 3.5 to 5 and 75° to 85°C for 20 to 100 minutes prior to cooling and addition of the sulfite.

The formaldehyde solution employed should preferably have a concentration of 25 to 40%, and the commercial formaldehyde solution having a nominal concentration of 30% is conveniently employed. The sulfite-bearing solution which is subjected to sequential alkaline and acid condensation should contain 2.5 to 3 gram-mole formaldehyde and 0.8 to 1.2 gram-atom sulfur as sulfite per gram-mole melamine for producing a resin of longest storage life.

The temperature during the acid condensation step may be chosen between 40° and 80°C, and the condensation period must be chosen to match the temperature and pH of the acid condensation mixture, the time decreasing with decreasing pH and increasing temperature. The sources of hydrogen and hydroxyl ions employed for the several pH adjustments during the process are not critical, and sulfuric or phosphoric acid, sodium or potassium hydroxide are preferred because of low cost.

The following Examples are further illustrative of this invention. All parts and percentage values are by weight.

EXAMPLE 1

700 Parts aqueous, 30% formaldehyde solution was adjusted to pH 4.5 by means of sodium hydroxide, and 294 parts melamine was added to the adjusted formaldehyde solution. The mixture so obtained was held at 80°C until a clear solution was formed. The solution was further held at 80°C for 30 minutes and then cooled to 45°C. 222 Parts sodium pyrosulfite ($Na_2S_2O_5$) was added, the resulting solution was diluted with 332 parts water, adjusted to pH 10.5 sodium hydroxide, and kept at 80°C for 2 hours. Thereafter, it was cooled to 50°C, acidified with a mixture of 2116 parts water and 70 parts concentrated sulfuric acid, and held at 50°C for 5 hours to cause condensation of the melamine and formaldehyde in the acid medium. The acid condensation mixture was then adjusted with sodium hydroxide to pH 8.5 and refluxed for one hour.

The resin solution so obtained contained 20% solids and had a pH of 6.7 and a viscosity of 16 cp at 20°C, as determined with a Brookfield rotary viscosimeter at 20 r.p.m., spindle No. 1. After two months of storage at ambient temperature of approximately 15° to 25°C, the pH was 6.8, but there was no measurable viscosity change.

EXAMPLE 2

The procedure of Example 1 was repeated except for omission of continued heating of the clear formaldehyde-melamine solution and of the ultimate refluxing step. The mixture of melamine and formaldehyde solution was promptly cooled to 45°C after it formed a clear solution, and the acid condensation mixture was stored under the same conditions as the product of Example 1 after pH adjustment to 8.5.

The resin solution at pH 8.5 obtained by the known procedure of Example 2 had an initial viscosity of 45 cp at 20°C, but the viscosity dropped to 27 cp after 2 months, and the pH dropped to 7.1.

EXAMPLE 3

Following the procedure of German Industrial Standard DIN 1164, Portland cement mixtures were prepared by the standard procedure and with addition of 10 or 20% of the resin solutions prepared according to Examples 1 and 2. The beginning and the termination of the solidification of each cement mixture were recorded. The results are listed in the Table in which the additives are identified by the Examples according to which they were prepared.

TABLE

| Additive | Solidification, min. | |
|---|---|---|
| | Beginning | Termination |
| None | 225 | 345 |
| 10% Ex. 1 | 300 | 390 |
| 20% Ex. 1 | 345 | 435 |
| 10% Ex. 2 | 720 | 825 |
| 20% Ex. 2 | 735 | 870 |

What is claimed is:

1. In a process for preparing a solution of sulfite modified melamine resin, wherein melamine is dissolved in aqueous formaldehyde solution at elevated temperature, the clear solution so formed is cooled, an alkali metal sulfite is dissolved in the cooled solution, the resulting sulfite bearing solution is adjusted to a pH value above 7, heated, again cooled, acidified, and heated to cause formation of said resin by condensation, and the condensation mixture obtained is adjusted to a pH value above 7, the improvement which comprises heating said condensation mixture at pH 8 to 11 for 1 to 3 hours at a temperature at which said mixture refluxes at atmospheric pressure.

2. In a process as set forth in claim 1, said clear solution being held at a pH of 3.5 to 5 for 20 to 100 minutes at 75° to 85°C prior to said cooling.

3. In a process as set forth in claim 2, said clear solution being held at a pH of 4.5 for said 20 to 100 minutes, and the pH of said condensation mixture during said heating thereof being approximately 8.5.

4. In a process as set forth in claim 1, the respective amounts of said melamine, said formaldehyde, and said alkali metal sulfite being such that said sulfite bearing solution contains 2.5 to 3 gram-moles formaldehyde and 0.8 to 1.2 gram-atom sulfur as sulfite per gram-mole melamine.

* * * * *